US009008236B2

(12) United States Patent
Jia et al.

(10) Patent No.: US 9,008,236 B2
(45) Date of Patent: *Apr. 14, 2015

(54) COMMUNICATION SIGNAL DECODING AND SOFT DEMAPPING

(71) Applicant: Microsoft Corporation, Redmond, WA (US)

(72) Inventors: Ming Jia, Ottawa (CA); Peiying Zhu, Kanata (CA); Wen Tong, Ottawa (CA); Jianglei Ma, Kanata (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/915,446

(22) Filed: Jun. 11, 2013

(65) Prior Publication Data

US 2013/0272458 A1 Oct. 17, 2013

Related U.S. Application Data

(63) Continuation of application No. 13/358,786, filed on Jan. 26, 2012, now Pat. No. 8,488,722, which is a continuation of application No. 10/913,403, filed on Aug. 9, 2004, now Pat. No. 8,116,410.

(51) Int. Cl.
*H04L 27/06* (2006.01)
*H04L 25/02* (2006.01)
*H04L 25/03* (2006.01)

(52) U.S. Cl.
CPC .......... *H04L 25/02* (2013.01); *H04L 25/03318* (2013.01); *H04L 2025/03426* (2013.01); *H04L 2025/03624* (2013.01)

(58) Field of Classification Search
USPC ......... 375/340, 260, 332, 343, 323, 261, 267, 375/341
See application file for complete search history.

(56) References Cited

U.S. PATENT DOCUMENTS

| 5,852,630 | A | 12/1998 | Langberg et al. |
|---|---|---|---|
| 7,245,666 | B1 | 7/2007 | Gardner et al. |
| 8,116,410 | B1 | 2/2012 | Jia et al. |
| 8,488,722 | B2 | 7/2013 | Jia et al. |

(Continued)

OTHER PUBLICATIONS

"Final Office Action", U.S. Appl. No. 10/913,403, (Jun. 23, 2010), 28 pages.

(Continued)

*Primary Examiner* — Kabir A Timory
(74) *Attorney, Agent, or Firm* — Julie Kane Akhter; Danielle Johnston-Holmes; Micky Minhas

(57) ABSTRACT

Symbol detection and soft demapping methods and systems are provided. Individual subset symbol detection according to one or more embodiments involves identifying a search subset of a transmission symbol set for a transmission symbol. For each other transmission symbol in communication signals, multiple search subsets of the transmission symbol set are identified. The multiple search subsets include respective search subsets based on each transmission symbol in either the search subset for the first identified one of the transmission symbols or each of the multiple search subsets identified for a different one of the other transmission symbols. Symbol detection errors may be detected by identifying competing symbols and computing competing distances. Soft demapping may be provided by calculating soft decision results based on detected symbols and weighting the soft decision result.

20 Claims, 6 Drawing Sheets

(56) References Cited

U.S. PATENT DOCUMENTS

| | | |
|---|---|---|
| 2002/0037057 A1 | 3/2002 | Kroeger et al. |
| 2004/0071235 A1 | 4/2004 | Love et al. |
| 2004/0198265 A1 | 10/2004 | Wallace et al. |
| 2006/0092882 A1 | 5/2006 | Ghosh et al. |
| 2006/0274844 A1 | 12/2006 | Walton et al. |
| 2008/0175122 A1 | 7/2008 | Pepin et al. |
| 2012/0121047 A1 | 5/2012 | Jia |

OTHER PUBLICATIONS

"Final Office Action", U.S. Appl. No. 10/913,403, (Aug. 26, 2009), 23 pages.

"Final Office Action", U.S. Appl. No. 13/358,786, (Jan. 16, 2013), 7 pages.

"Non-Final Office Action", U.S. Appl. No. 10/913,403, (Apr. 12, 2011), 23 pages.

"Non-Final Office Action", U.S. Appl. No. 10/913,403, (Jun. 11, 2008), 19 pages.

"Non-Final Office Action", U.S. Appl. No. 10/913,403, (Nov. 26, 2008), 23 pages.

"Non-Final Office Action", U.S. Appl. No. 10/913,403, (Dec. 5, 2007), 28 pages.

"Non-Final Office Action", U.S. Appl. No. 10/913,403, (Dec. 17, 2009), 22 pages.

"Non-Final Office Action", U.S. Appl. No. 13/358,786, (May 23, 2012), 9 pages.

"Notice of Allowance", U.S. Appl. No. 10/913,403, (Oct. 7, 2011), 11 pages.

"Notice of Allowance", U.S. Appl. No. 10/913,403, (Oct. 19, 2011), 4 pages.

"Notice of Allowance", U.S. Appl. No. 13/358,786, (Mar. 13, 2013), 6 pages.

"Notice of Panel Decision from Pre-Appeal", U.S. Appl. No. 10/913,403, (Dec. 22, 2010), 2 pages.

Li, X et al., "Reduced-complexity detection algorithms for systems using multi-elements array", *Bell Laboratories, Global Telecommunications Conference, GLOBECOM 2000, IEEE*, (Dec. 1, 2000), pp. 1072-1076.

COMMUNICATION SIGNAL DECODING AND SOFT DEMAPPING

RELATED APPLICATIONS

This application is a continuation of and claims priority to U.S. patent application Ser. No. 13/358,786, entitled "Communication Signal Decoding and Soft Demapping Methods and Systems", filed on Jan. 26, 2012 which is a continuation of and claims priority to U.S. patent application Ser. No. 10/913,403, entitled "Communication Signal Decoding and Soft Demapping Methods and Systems", filed on Aug. 9, 2004, which is now U.S. Pat. No. 8,116,410, granted on Feb. 14, 2012, the disclosure of which are incorporated herein by reference in their entirety.

BACKGROUND

In communication systems in which information is encoded using transmission symbols from a transmission symbol set, such as Quadrature Amplitude Modulation (QAM) symbols or Quadrature Phase Shift Keying (QPSK) symbols from a QAM or QPSK constellation for instance, symbols in communication signals are detected and decoded at a receiver.

Although many transmission symbol detection techniques are known, these techniques are generally not feasible for communication systems in which multiple symbols are substantially concurrently received. Multiple Input Multiple Output (MIMO) communication systems represent one example of this type of communication system. The complexity of known techniques increases with both the size of a transmission symbol set and the number of symbols which are to be concurrently detected.

There are currently two kinds of MIMO decoding schemes, including Maximum Likelihood (ML) and Interference Cancellation (IC). ML decoders provide optimum performance, but ML decoder complexity increases exponentially with both the size of a transmission symbol set and the number of symbols which are to be concurrently detected. An IC decoder provides less satisfactory performance, but its complexity increases approximately linearly with both the size of a transmission symbol set and the number of symbols.

SUMMARY

According to one or more embodiments, a method is provided of processing communication signals which carry transmission symbols from a transmission symbol set. The method includes identifying a search subset of the transmission symbol set for one of the transmission symbols in the communication signals and identifying, for each other transmission symbol in the communication signals, multiple search subsets of the transmission symbol set. The multiple search subsets include respective search subsets based on each transmission symbol in either the search subset for the one of the transmission symbols or each of the multiple search subsets identified for a different one of the other transmission symbols.

In some embodiments, the operations of identifying a search subset and identifying multiple search subsets involve estimating the transmission symbols in the communication signals using a zero forcing (ZF) algorithm.

The one transmission symbol which is initially identified may be a transmission symbol which satisfies a selection criterion, such as an absolute signal to interference and noise ratio (SINR) criterion, a relative SINR criterion, an absolute signal to noise ratio (SNR) criterion, or a relative SNR criterion.

The method may also include adjusting a communication signal model for the one transmission symbol, and determining a characteristic of each of the transmission symbols in the communication signals other than the one transmission symbol based on the adjusted communication signal model. In this case, the operation of identifying multiple search subsets may include identifying multiple search subsets, for one of the other transmission symbols for which the determined characteristic satisfies a selection criterion, based on each transmission symbol in the search subset for the one of the transmission symbols.

The operation of identifying multiple search subsets may include iterating an operation of identifying multiple search subsets for each of the other transmission symbols. In any iteration, the multiple search subsets identified for a transmission symbol would include search subsets based on each transmission symbol in each of the multiple search subsets identified for a different transmission symbol in a preceding iteration.

Some embodiments also include an operation of extracting interference associated with a transmission symbol from the communication signals, and identifying a respective one of the multiple search subsets based on the communication signals from which the interference has been extracted.

In one implementation, the communication signals are associated with respective layers in a MIMO communication system, and the transmission symbols are Quadrature Amplitude Modulation (QAM) symbols or Quadrature Phase Shift Keying (QPSK) symbols.

A system for processing communication signals is also provided, and includes an input configured to receive communication signals which include transmission symbols from a transmission symbol set and a processor. The processor is configured to identify a search subset of the transmission symbol set for one of the transmission symbols in the communication signals, and to identify, for each other transmission symbol in the communication signals, multiple search subsets of the transmission symbol set. The multiple search subsets include respective search subsets based on each transmission symbol in either the search subset for the one of the transmission symbols or each of the multiple search subsets identified for a different one of the other transmission symbols. The processor may also be configured to perform the operations in a particular manner, and to perform further operations.

Further aspects provide a corresponding system and method at a communication signal transmitting side. Information is encoded using transmission symbols from a transmission symbol set, and communication signals including the transmission symbols are transmitted to a receiver. The transmission symbols are detected at the receiver by identifying a search subset of the transmission symbol set for one of the transmission symbols in the communication signals, and identifying, for each other transmission symbol in the communication signals, multiple search subsets of the transmission symbol set.

According to another embodiment, a method of detecting transmission symbols from communication signals comprising transmission symbols from a transmission symbol set involves determining a detected symbol for a transmission symbol in the communication signals and a competing transmission symbol for the detected symbol from the transmission symbol set, determining a first distance between the detected symbol and another symbol detected from the communication signals and a second distance between the competing transmission symbol and a transmission symbol associated with the other detected symbol, and detecting an error in the detected symbol based on the first distance and the second distance.

The operation of determining a detected symbol and a competing transmission symbol for the detected symbol may include detecting a transmission symbol from the communication signals, such as by identifying a search subset of the transmission symbol set and selecting the detected symbol and the competing transmission symbol from the search subset.

In another embodiment, determining a detected symbol and a competing transmission symbol for the detected symbol includes determining multiple competing transmission symbols for the detected symbol. The multiple competing transmission symbols include transmission symbols other than the detected symbol in the search subset. In this case, determining a second distance includes determining respective second distances between each of the competing transmission symbols and the transmission symbol associated with the other detected symbol, and wherein detecting comprises detecting an error in the detected symbol based on the first distance and the respective second distances.

The other detected symbol may be a transmission symbol selected from one of a number of other search subsets of the transmission symbol set. The other search subsets may respectively correspond to the detected symbol and the competing transmission symbols for the detected symbol, for example. The transmission symbol associated with the other detected symbol may actually include transmission symbols respectively selected from the other search subsets corresponding to the competing transmission symbols for the detected symbol. Determining a second distance may then include determining respective second distances between each of the competing transmission symbols for the detected symbol and the transmission symbol selected from the other search subset corresponding thereto. In this case, detecting may include detecting an error in the detected symbol based on the first distance and the respective second distances.

According to one embodiment, a competing transmission symbol for the other detected symbol is the transmission symbol associated with the other detected symbol comprises the competing transmission symbol for the other detected symbol. In another embodiment, the transmission symbol associated with the other detected symbol comprises the other detected symbol itself.

Where an error is detected, in response to the first distance exceeds the second distance for instance, an error processing operation may be performed. Illustrative examples of an error processing operation include repeating a detecting operation, erasing the detected symbol, and erasing a portion of the detected symbol.

A related system for detecting transmission symbols from communication signals which include transmission symbols from a transmission symbol set, according to one or more embodiments, includes an input and a processor. The processor is configured to determine a detected symbol for a transmission symbol in the communication signals and a competing transmission symbol for the detected symbol from the transmission symbol set, to determine a first distance between the detected symbol and another symbol detected from the communication signals and a second distance between the competing transmission symbol and a transmission symbol associated with the other detected symbol, and to detect an error in the detected symbol based on the first distance and the second distance. The processor may also be configured to perform these operations in a particular manner, and to perform other operations.

At a transmitter side, information is encoded using transmission symbols from a transmission symbol set, and communication signals which include the transmission symbols are transmitted to a receiver for symbol detection.

There is also provided a method of detecting transmission symbols in communication signals. Respective detected symbols are determined for multiple transmission symbols. Soft decision results are then determined for each detected symbol based on others of the detected symbols. A respective weight for each soft decision result is determined and applied to the corresponding soft decision result.

A related system for detecting transmission symbols from communication signals includes an input configured to receive the communication signals and a processor. The processor is configured to determine respective detected symbols for multiple transmission symbols, to determine a soft decision result for each detected symbol based on others of the detected symbols, to determine a respective weight for each soft decision result, and to apply the corresponding weight to the soft decision result.

Other aspects and features of communication signal decoding and soft demapping will become apparent to those ordinarily skilled in the art upon review of the following description of one or more embodiments.

BRIEF DESCRIPTION OF THE DRAWINGS

Examples embodiments of communication signal decoding and soft demapping will now be described in greater detail with reference to the accompanying drawings, in which.

DETAILED DESCRIPTION

Figure 1:
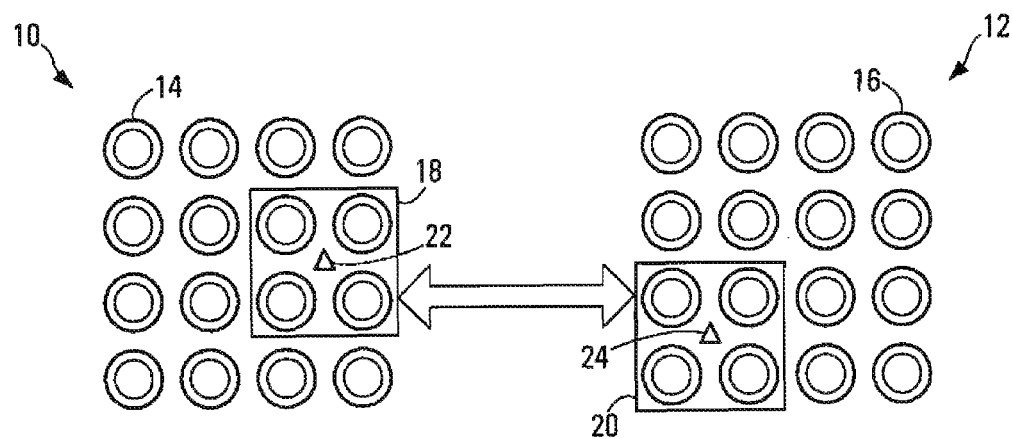
FIG. 1 is a representation of a transmission symbol set and shared subsets for symbol detection.

As described above, many transmission symbol detection schemes are not suitable for communication systems in which multiple symbols are received at substantially the same time. An MXN MIMO system with M receiving antennas and N transmitting antennas, for example, is defined by $$\vec{r} = H\vec{s} + \vec{n}, \qquad (1)$$

where $\vec{r} = [r_1 \ r_2 \ \ldots \ r_M]^T$ is a vector of received signals, $\vec{s} = [s_1 \ s_2 \ \ldots \ s_N]^T$ is a vector of transmitted signals which include transmission symbols, $\vec{n} = [n_1 \ n_2 \ \ldots \ n_M]^T$ is a noise vector with components drawn from wide-sense stationary processes with variance $\sigma^2$, and $$H = \begin{bmatrix} h_{11} & h_{12} & \ldots & h_{1N} \\ h_{21} & h_{22} & \ldots & h_{2N} \\ \vdots & \vdots & \ddots & \vdots \\ h_{M1} & h_{M2} & \ldots & h_{MN} \end{bmatrix}$$

is a communication channel matrix.

A zero forcing (ZF) solution of Equation (1), to satisfy $$\arg\min_{\tilde{s}} \| \vec{r} - H\tilde{s} \|$$

is given by $$\tilde{s} = (H'H)^{-1}H'\vec{r} \quad (2)$$
$$= \vec{s} + (H'H)^{-1}H'\vec{n},$$

where

H' is a conjugate transpose of H, illustratively a Hermitian conjugation.

Denoting $$G = (H'H)^{-1}H', \quad (3)$$

with $G_i$ being the ith row of G, and $g_i = G_i G'_i$, the estimated signals $\tilde{s}_i$ in $\tilde{s}$ may be normalized by $g_i$.

It should be noted that the above weighting factor $g_i$ is not determined by only the ith column of H. In fact, all the channel matrix elements contribute to the weighting factor. This is because the reliability of a particular MIMO layer is not determined by only the corresponding column of H, but by the channel matrix condition as well. In the above example, there are N layers which correspond to the N columns of H and the N elements of $\tilde{s}$.

A modified ZF algorithm which uses iterative interference cancellation has been proposed to mitigate the effects of interference in traditional ZF techniques, but when concatenated with widely used Turbo codes, for example, the advantage of this algorithm tends to diminish. This is because although Turbo codes are well suited for correcting random small value errors, they are vulnerable to strong burst errors. With this modified ZF algorithm, although the number of hard decision errors is reduced by iteratively cancelling interference, soft-detected values may be large when incorrect interference cancellation occurs, which can be difficult for Turbo codes to handle.

ML techniques are often used to detect transmission symbols in communication signals. In full search ML detection, an entire transmission symbol set is searched to determine a most likely transmission symbol. Thus, full search ML detection can be relatively complex and time consuming for larger order transmission symbol sets, particularly when multiple transmission symbols are received concurrently. Subset ML symbol detectors restrict the symbol detection search space to reduce detection complexity and search times.

There are currently two versions of shared subset ML detectors, including basic shared subset detectors and iterative shared subset detectors, both of which rely on ZF as a guide to locate the ML solution candidates. The basic objective of subset ML detection techniques is to reduce the size of symbol space to be searched.

The basic shared subset ML detector is the simplest from the algorithm point of view. The ZF solution from Equation (2) provides a guide for subset selection, and an ML search is carried out on signal combinations formed from these selected subsets. FIG. 1 is a representation of a transmission symbol set and shared subsets for symbol detection according to the basic shared subset technique.

In FIG. 1, a transmission symbol set is shown at 10 and 12, and includes a plurality of transmission symbols designated 14 and 16. Although shown and labelled separately in FIG. 1 for the purposes of more clearly illustrating search subsets for different symbols, it should be apparent that 10 and 12 represent the same transmission symbol set. The sixteen transmission symbols in the set 10, 12 may be QAM symbols in a 16-QAM constellation, for example.

The search subsets 18, 20 of the transmission symbol set 10, 12 are identified based on ZF solutions, labelled 22, 24. With reference to the above example of a MIMO system, the ZF solutions 22, 24 and search subsets 18, 20 may correspond to $s_1$ and $s_2$ in a 2×2 MIMO communication system. The premise for basic shared subset detection is that for a given ZF solution 22 for $s_1$, the most likely ML solutions for $s_2$ are in the subset 24, which includes candidate symbols generally referred to hereinafter as $s_{2,1}$, $s_{2,2}$, $s_{2,3}$, $s_{2,4}$. Similarly, for a given ZF solution 24 for $s_2$, the most likely ML solutions for $s_i$ are expected to be in the subset 18, which includes candidate symbols generally referred to hereinafter as $s_{1,1}$, $s_{1,2}$, $s_{1,3}$, $s_{1,4}$. These two subsets 18, 20 form sixteen combinations, and basic shared subset detectors operate on the assumption that the actual combination of transmitted symbols $s_1$, $s_2$ is one of them.

As those skilled in the art will appreciate, transmission symbols which are received at substantially the same time are not independent in interference dominated systems such as a MIMO system. The iterative shared subset selection ML detector is substantially similar to the basic shared subset detector, except that interference associated with a detected symbol is cancelled from received communication signals, and the interference-cancelled communication signals are then used to determine a ZF solution for a next symbol to be detected. The motivation for this type of detector is to provide for more reliable search subset identification for each symbol to be detected.

In FIG. 1, for example, if the ZF solution 22 is first used to identify the search subset 18, the search subset 18 is searched to determine a most likely symbol, the detected symbol is effectively assumed to be correct, and interference caused by that symbol is cancelled from received communication signals. The interference-cancelled communication signals are used to determine the ZF solution 24 and the search subset 20 is then identified. Iterative shared subset selection may reduce the number of symbol detection errors, but the problem of error propagation still exists.

Another problem with shared subset ML detectors is that the shared subsets might not be the optimal candidates for each symbol combination. With reference to FIG. 1, although $s_{2,1}$, $s_{2,2}$, $s_{2,3}$, $s_{2,4}$ in the subset 20 are the most likely candidates for $s_2$ when $s_1$ is within the subset 18, they are not necessarily the best candidates for each of $s_{1,1}$, $s_{1,2}$, $s_{1,3}$, or $s_{1,4}$, any of which could be actual ML solution. In other words, each $s_{1,i}|_{i=1,2,3,4}$ has its own corresponding most likely candidate set for $s_2$, which can be quite different from $s_{2,1}$, $s_{2,2}$, $s_{2,3}$, $s_{2,4}$ in the subset 20. However, in shared subset selection ML detectors, all the symbols in the subset 18 share the same combination subset 20, and vice versa.

Individual subset selection ML detection as proposed herein is a more powerful subset ML decoder. In this type of detector, search subsets are identified for a symbol to be detected based on each candidate symbol in each search subset for another symbol. Each search subset is thus identified individually rather than sharing one common subset.

For each candidate symbol $s_{1,1}, s_{1,2}, s_{1,3}, s_{1,4}$ in the search subset 18 for $s_1$, a respective corresponding search subset for $s_2$ is identified. Each candidate symbol $s_{1,1}, S_{1,2}, s_{1,3}, s_{1,4}$ for $s_1$ thus has four corresponding candidate symbols for $s_2$, resulting in sixteen combinations. However, since interference between layers is not only in one "direction", individual subsets for $s_1$ may also be identified for candidates for $s_2$. For example, from a subset of four symbols for $s_2$ on the right, sixteen symbols could be identified for $s_1$ on the left. With sixteen symbols on each side, the combined search space is composed of 16×16=256 points. For a 4×4 MIMO system, the number of search points may be 65,536.

It should be appreciated that there are also other ways to compose the search space, and hence the corresponding search space sizes can be different. If the search space is limited to sixteen points from left to right and sixteen from right to left, for instance, the combined search space would be 16+16=32. Another possible scheme involves identifying four candidate symbols for $s_1$ for each of the sixteen candidate symbols for $s_2$, giving 64 search points. Regardless of which technique is used, the basic idea is the same, i.e., both "directions" may be important. In the case of systems with more than two layers (e.g., 4×4 MIMO systems), the search space will be more complicated.

The advantage provided by individual search subset selection relative to shared subset detection techniques in terms of optimal symbol detection due to expanded search space thus comes at a cost of increased complexity. According to one or more embodiments, the complexity of an individual subset selection detector is reduced by reducing the number of search points.

Figure 2:
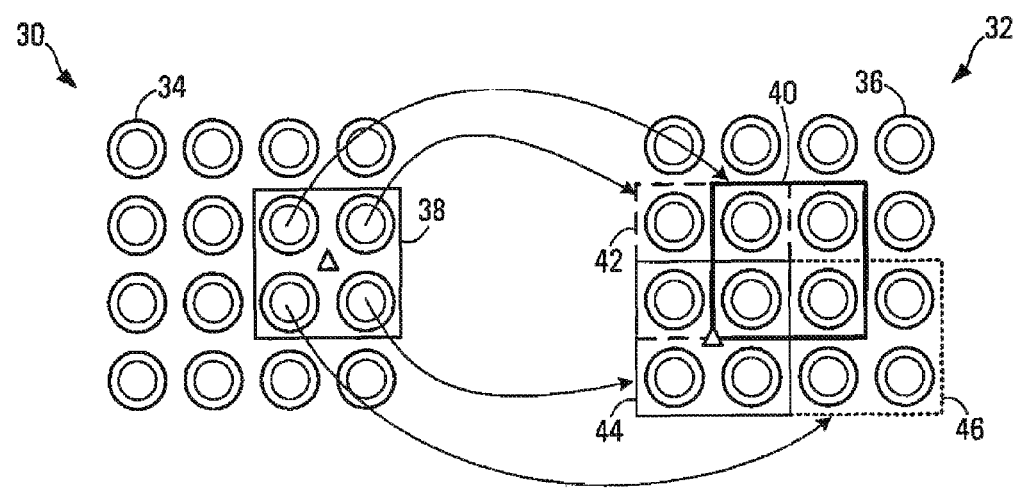
FIG. 2 is a representation of a transmission symbol set and individual subsets for symbol detection according to one or more embodiments.

FIG. 2 is a representation of a transmission symbol set and individual subsets for symbol detection according to one or more embodiments. In FIG. 2, as in FIG. 1, a transmission symbol set is shown at 30 and 32, for detection of two symbols in received communication signals, and includes symbols 34 and 36. A search subset 38 for one transmission symbol is identified on the basis of a ZF solution, and respective search subsets 40, 42, 44, 46 are identified for the candidate symbols in the subset 38.

One or more embodiments may be implemented in conjunction with other sizes of transmission symbol sets and search subsets than those explicitly shown in FIG. 2. It should therefore be appreciated that the representation in FIG. 2, as well as the contents of the other drawings, are intended solely for illustrative purposes, and that the present invention is in no way limited to the particular example embodiments shown in the drawings and described herein.

Individual subset selection according to one or more embodiments is described in further detail below with reference to FIG. 3, which is a flow diagram of a method of processing communication signals comprising transmission symbols from a transmission symbol set. As described above, the communication signals and symbols may be associated with layers in a MIMO communication system.

Figure 3:
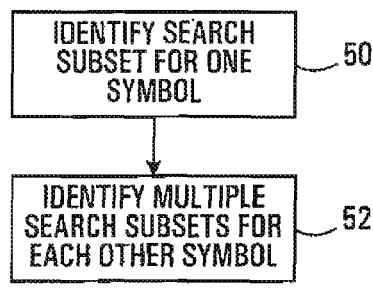
FIG. 3 is a flow diagram of a method according to one or more embodiments.

The method of FIG. 3 includes identifying, at 50, a search subset of the transmission symbol set for use in detecting one of the transmission symbols in the communication signals. At 52, multiple search subsets of the transmission symbol set for use in detecting another of the transmission symbols in the communication signals are identified. The multiple search subsets include respective search subsets based on each transmission symbol in the search subset for the one of the transmission symbols. With reference to FIG. 2, the search subset 38 is identified at 50 and the search subsets 40, 42, 44, 46 are identified at 52. Identification of search subsets for each further symbol in the communication signals proceeds in a similar manner, but is based on each transmission symbol in each of the multiple search subsets identified for a different symbol.

The one transmission symbol for which the initial search subset is identified may be a transmission symbol which satisfies a selection criterion. According to a one or more embodiments, the selection criterion is a relative signal to interference and noise ratio (SINR) criterion. A symbol having the highest SINR is the symbol most likely to be detected correctly, and the initial search subset may thus be identified using a ZF solution for the highest SINR symbol. As the above weighting factor $g_i$ also provides an indication of SINR, $g_i$ may be used in determining for which symbol the initial search subset is to be identified.

It should be appreciated that other measures of SINR, or other selection criteria such as an absolute SINR criterion, an absolute signal to noise ratio (SNR) criterion, or a relative SNR criterion, may also be used in selecting a particular symbol for initial search subset identification at 50. Embodiments in which more than one selection criterion is used are also contemplated.

For each transmission symbol in the initial search subset, interference associated with that transmission symbol may be extracted from the communication signals, and a respective one of the multiple search subsets is identified based on the communication signals from which the interference has been extracted. Referring again to FIG. 2, for example, assuming that $s_1$ has a higher SINR than $s_2$ or satisfies some other criterion, then the search subset for each $s_{1,i}|_{i=1,2,3,4}$ can be identified by the following steps:

subtract $s_{1,i}|_{i=1,2,3,4}$ from the received signal: $\bar{r}\,|_{-s_{1,i}} = \bar{r} - H_1 s_{1,i}$, where $H_i$ denotes the i th row of H;

calculate the new ZF solution: $\tilde{s}_2|_{-s1,i} = H'_2 \bar{r}\,|_{-s_{1,i}} / \|H'_2\|^2$; and use $\tilde{s}_2|_{-s_{1,i}}$ to identify the corresponding subset for $s_2$.

Thus, corresponding subsets are no longer shared by all the candidate elements $s_{1,i}|_{i=1,2,3,4}$. This approach can be implemented in both directions, resulting in double sized constellation combinations.

Multiple search subsets are identified for each symbol other than the symbol for which the initial search subset was identified at 50, resulting in an iterative process of ordered sequential subset identification (OSSI) at 52. Although a transmission symbol set is shown for only two symbols in FIG. 2, more than two symbols may be concurrently detected in higher order systems such as 4×4 MIMO systems for instance. The multiple search subsets identified for a transmission symbol in any iteration then includes respective search subsets based on each candidate symbol in each of the multiple search subsets identified for a different transmission symbol in a preceding iteration.

Selection of a symbol for each iteration may also be based on a selection criterion, which may be the same criterion used for selection of a symbol for the initial search subset identification. In one embodiment, before each iteration, a communication signal model is adjusted for a transmission symbol for which subsets were identified in a previous iteration. A characteristic of each remaining transmission symbol for which search subsets have not yet been identified is determined based on the adjusted communication signal model and used in selecting the transmission symbol for a current iteration. The operations of determining a characteristic and applying the selection criterion may be omitted for a last remaining transmission symbol.

According to one embodiment, selection of a transmission symbol for a current iteration is based on a highest SINR, and the characteristic is the above factor $g_i$. Before each iteration, the communication channel model, as in Equation (1) above for instance, is adjusted by removing from the channel matrix H the columns for any symbols for which search subsets have already been identified. The symbol with the highest SINR is then selected for the current iteration, ZF solutions for that symbol are determined for each candidate symbol in the search subset or subsets identified in a preceding iteration, and search subsets for the symbol are identified based on the ZF solutions.

Search subsets identified for a symbol in each iteration may be shared for symbols identified in subsequent iterations to thereby reduce the total number of search points. For an N×N MIMO system using search subsets having four symbols, the total number of combinations is $4^N$, regardless of the order of the transmission symbol set. Thus, for a 2×2 and 4×4 MIMO systems with four-symbol search subsets, there are 16 and 256 search points, respectively. This is substantially less than the 256 and 65,536 search points for 2×2 and 4×4 MIMO systems using 16-QAM constellations and full ML detection or basic shared subsets, and the 4,096 and 16,777,216 search points for 2×2 and 4×4 MIMO systems using 64-QAM constellations and full ML detection or basic shared subsets.

Figure 4:
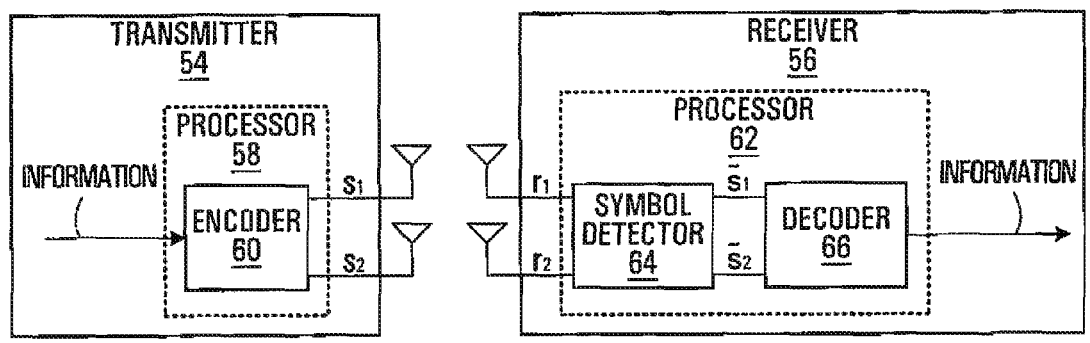
FIG. 4 is a block diagram of a communication system in which one or more embodiments may be implemented.

FIG. 4 is a block diagram of a communication system in which one or more embodiments may be implemented. The system of FIG. 4 provides an illustrative example of a 2×2 MIMO system in which a transmitter 54 and a receiver 56 each have 2 antennas, although the embodiments may also be applied to other dimensions of MIMO systems and other types of communication systems.

In the transmitter 54, an encoder 60, which may be implemented as shown in a processor 58 such as a digital signal processor or a multi-purpose processor which executes instructions for performing encoding operations, encodes information using transmission symbols in a transmission symbol set to generate communication signals including the symbols $s_1$ and $s_2$ and outputs the communication signals for transmission by respective antennas to the receiver 56.

The receiver 56 receives communication signals $r_1$ and $r_2$ via its antennas. A symbol detector 64, also implemented in a processor 62 in one embodiment, detects transmission symbols in the received signals and outputs detected symbols $\tilde{s}_1$ and $\tilde{s}_2$, which may be further processed by a decoder 66, and possibly other components or elements of the receiver 56, to recover the originally transmitted information. The soft demapped symbols $\tilde{s}_1$ and $\tilde{s}_2$ represent examples of one type of detected symbol which may be output from the detector 64. One or more embodiments may provide hard or soft decision symbol detection outputs.

The symbol detector 64 is configured to detect symbols in the received communication signals substantially as described above, by identifying a search subset of the transmission symbol set for use in detecting one of the transmission symbols in the communication signals, and identifying multiple search subsets of the transmission symbol set for use in detecting others of the transmission symbols in the communication signals.

Symbol detection in accordance with one or more embodiments may be performed at a network element, illustratively a base station, in a communication network, or at a communication terminal operating within the network. Thus, either or both of network elements and communication terminals may include a transmitter 54 and/or a receiver 56 as shown in FIG. 4, depending upon whether the signal processing operations as disclosed herein are to be supported for uplink communications, downlink communications, or both. In a more general sense, communication equipment may incorporate a transmitter 54, a receiver 56, or both.

The following table presents example results which illustrate effects of an embodiment, for a 2×2 MIMO system defined by $$H = \begin{bmatrix} -0.8114 + 0.6260i & 1.3858 - 0.4860i \\ -0.7904 + 0.3985i & 1.4681 - 1.5021i \end{bmatrix}, \quad (4)$$

with transmitted signals $\vec{s} = [-3+3i-3-3i]^T$ and received (corrupted) signals $\vec{r} = [-3.2473-6.9577i-8.3363-4.1084i]^T$

| With Shared Subset Selection | | | With Individual Subset Selection | | |
|---|---|---|---|---|---|
| $s_1$ | $s_2$ | $\|\vec{r} - H\vec{s}\|^2$ | $\|\vec{r} - H\vec{s}\|^2$ | $s_1$ | $s_2$ |
| −3 + 1i | −3 − 3i | 9.6788 | 4.0631 | −3 + 3i | −3 − 3i |
| −1 + 1i | −3 − 3i | 21.8849 | 9.6788 | −3 + 1i | −3 − 3i |
| −3 − 1i | −3 − 3i | 29.9652 | 16.2692 | −1 + 3i | −3 − 3i |
| −1 − 1i | −3 − 3i | 42.1713 | 21.8849 | −1 + 1i | −3 − 3i |
| −3 + 1i | −3 − 1i | 65.0262 | 33.9084 | −3 + 3i | −3 − 1i |
| −1 + 1i | −3 − 1i | 76.1994 | 65.0262 | −3 + 1i | −3 − 1i |
| −3 − 1i | −3 − 1i | 110.8145 | 45.0816 | −1 + 3i | −3 − 1i |
| −1 − 1i | −3 − 1i | 121.9878 | 76.1994 | −1 + 1i | −3 − 1i |
| −3 + 1i | −1 − 3i | 24.6442 | 8.1401 | 1 + 3i | −1 − 3i |
| −1 + 1i | −1 − 3i | 11.3483 | 12.7230 | 1 + 1i | −1 − 3i |
| −3 − 1i | −1 − 3i | 43.8977 | 6.7654 | −1 + 3i | −1 − 3i |
| −1 − 1i | −1 − 3i | 30.6018 | 11.3483 | −1 + 1i | −1 − 3i |
| −3 + 1i | −1 − 1i | 79.9916 | 35.9196 | 1 + 3i | −1 − 1i |
| −1 + 1i | −1 − 1i | 65.6628 | 66.0046 | 1 + 1i | −1 − 1i |
| −3 − 1i | −1 − 1i | 124.7471 | 35.5779 | −1 + 3i | −1 − 1i |
| −1 − 1i | −1 − 1i | 110.4183 | 65.6628 | −1 + 1i | −1 − 1i |

Since $s_2$ has higher SNR in this example, it is more likely to be correctly detected. By searching the corresponding subset for each $s_{2,i}|_{i=1,2,3,4}$ we get the sixteen search points shown in the table.

It is interesting to note that for each search point, individual subset selection results in better results than the corresponding or nearest combination for shared subset selection. For example, $\|\vec{r} - H\vec{s}\|^2$ is 4.0631 vs. 9.6788 for the first listed search point, 33.9084 vs. 65.0262 for the fifth listed search point, 6.7654 vs. 11.3483 for the individual search subset point $\vec{s} = [-1+3i-1-3i]^T$ and the nearest shared search subset point $\vec{s} = [-1+1i-1-3i]^T$, and 35.5779 vs. 65.6628 for the individual search subset point $\vec{s} = -[1+3i-1-1i]^T$ and the nearest shared search subset point $\vec{s} = [-1+1i-1-1i]^T$. Most importantly, while individual subset selection correctly detected the transmitted symbols, shared subset failed.

The above steps can easily be extended to higher order MIMO systems. In one or more embodiments, the selection of subsets is sequential, with layers of higher SINR, for example, having higher priority. With subset size being four, the total number of constellation combinations is $4^N$. Note that for higher order MIMO systems, shared subset ML detectors are impractical, as the chance that one subset can be shared by all the combinations in other layers, with each subset containing the ML solution, is very low. Thus, individually selected subset symbol detection as disclosed herein provides practical subset ML-based symbol detection for higher order MIMO, which is not feasible using traditional ML detection techniques.

Figure 5:
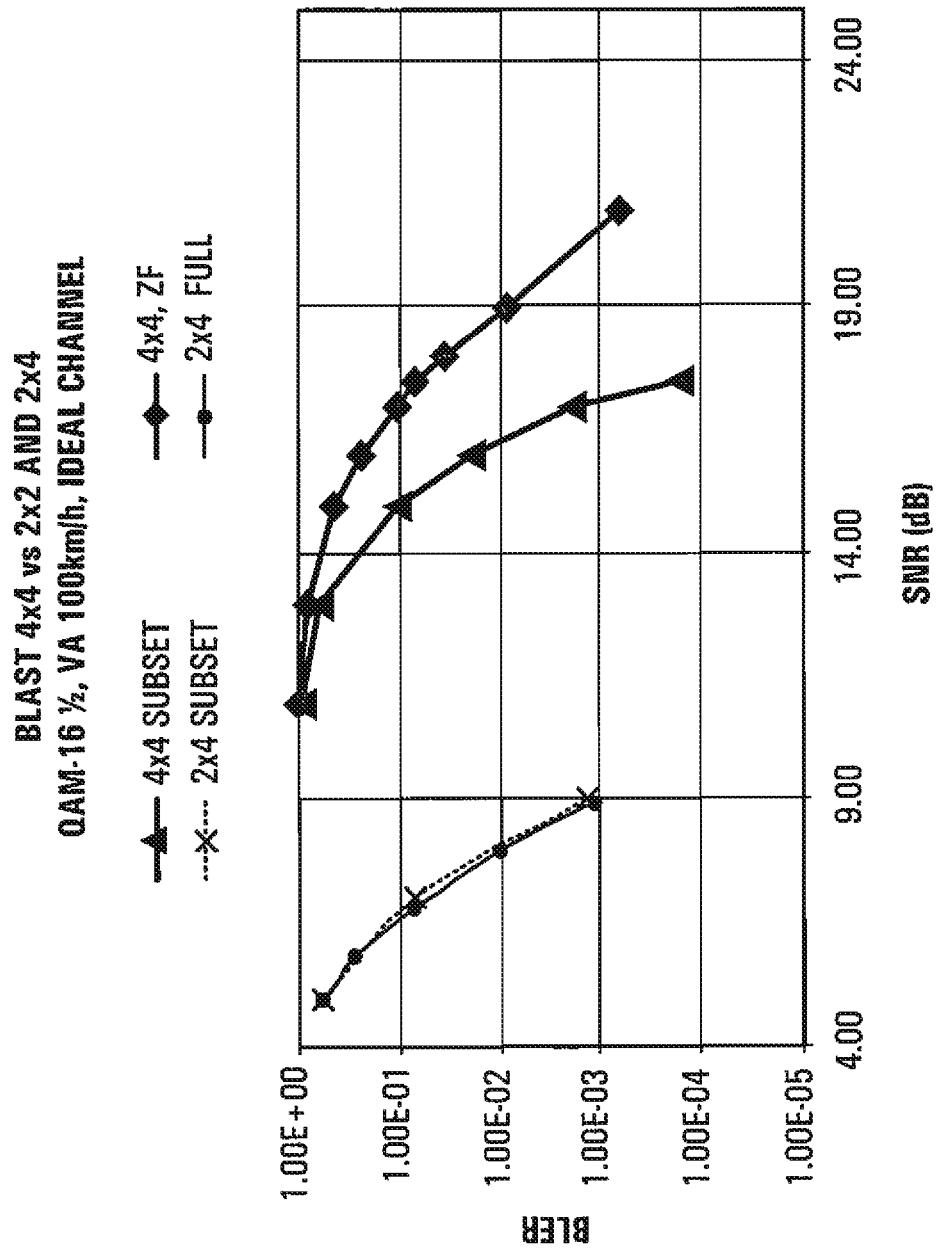
FIGS. 5 and 6 are plots of example simulation results.
Figure 6:
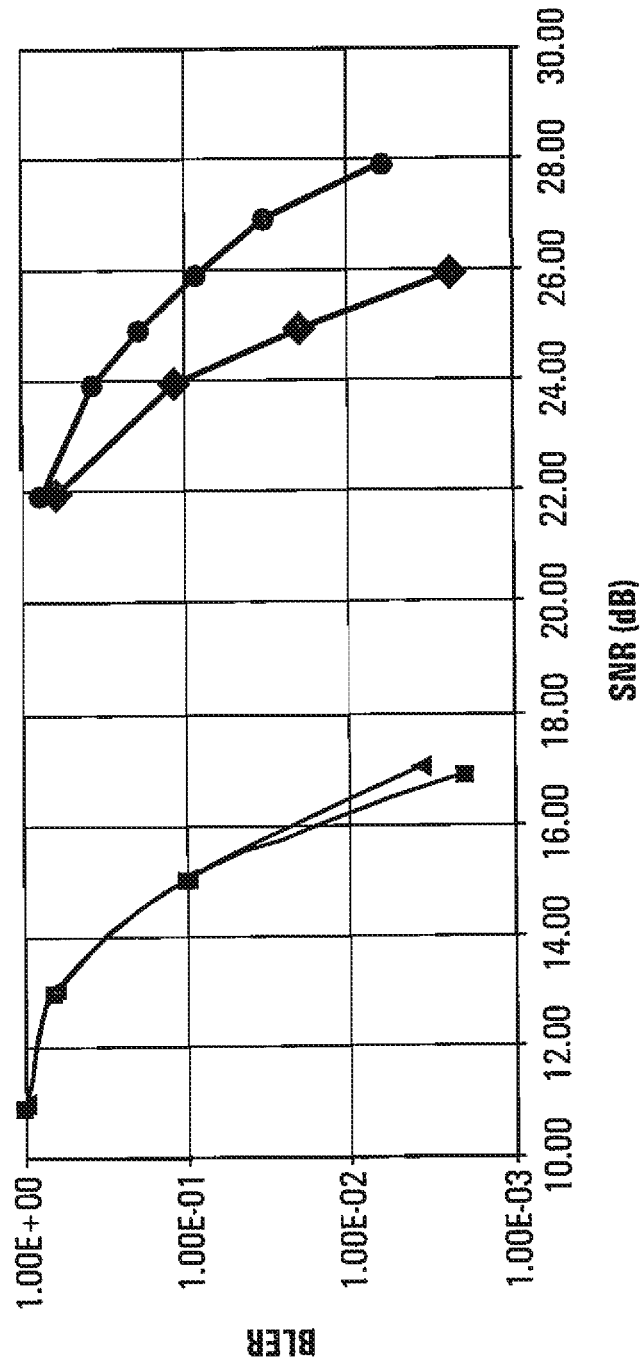

FIGS. 5 and 6 are plots of example simulation results for one or more embodiments and conventional symbol detection techniques. 2×4 full ML search symbol detection and 4×4 ZF have been shown in FIGS. 5 and 6 as comparative examples. It should be appreciated that the simulation conditions listed in FIGS. 5 and 6 are for illustrative purposes only. Other conditions and actual implementations may provide different results.

For FIG. 5, the simulation conditions are a 16 symbol QAM constellation, one-half code rate, vehicular A ideal channel, and receiver speed of 100 km/h Individual subset detection, denoted "subset" in FIG. 5, may be compared full ML and ZF. For the case of full ML comparison, we have two configurations: 2×4 and 4×4, For the 2×4 configuration, individual subset detection provides comparable performance to full ML. For the 4×4 configuration, since full ML simulation is impractical, we compare the slope of the 4×4 individual subset curve to that of the 2×4 full ML case instead. Since these curves have similar slopes, it can be concluded that the individual subset ML decoder achieves the same level of diversity gain as the full ML decoder, which is the main advantage of an ML decoder over other non-ML decoders, but with a reduced number of search points.

A further advantage of individual subset detection becomes apparent from a comparison to the ZF performance curve for the 4×4 configuration).

Similarly, as shown in FIG. 6, 2×4 individual subset detection in accordance with one or more embodiments provides comparable performance to full ML, and 4×4 individual subset detection provides the same level of diversity gain as the full ML decoder and better performance than ZF detection for a 64 symbol QAM constellation, two-thirds code rate, vehicular A ideal channel, and receiver speed of 100 km/h Soft demapping or detection of transmission symbols in a MIND signal tends to be much more difficult than finding a MIND hard decision solution. Whereas a MIND hard decision may use a ZF solution as guidance, as described above, no such guidance is available for soft demapping.

In addition, transmission symbols may contain multiple bits. QAM symbols, for example, often contain 4 or 6 bits. As the complexity of one bit soft demapping is similar to finding a hard decision solution for a symbol, the complexity of soft demapping can be enormous, particularly for MIMO systems and other types of system in which multiple symbols are received concurrently.

The above problem of error propagation can further complicate the implementation of soft demapping techniques in interference dominated systems such as MIMO systems, in that erroneous soft demapping may de-emphasize a Forward Error Correction (FEC) decoder input for instance.

The optimal soft demapping for an ML detector is determined by $$\Lambda(b_i) = \log \frac{\sum_{\bar{s}=f(\bar{b})b_i=1} \prod_{i=1}^{N} \exp\left(-\frac{\left|r_i - \sum_{j=1}^{M} h_{ij}s_j\right|^2}{\sigma^2}\right)}{\sum_{\bar{s}=f(\bar{b})b_i=0} \prod_{i=1}^{N} \exp\left(-\frac{\left|r_i - \sum_{j=1}^{M} h_{ij}s_j\right|^2}{\sigma^2}\right)}$$

where $\sigma^2$ denotes the noise power per receive antenna. This implies that for a MIMO system with N transmit antennas, we need to search a Euclidean distance table of size $$\frac{q^N}{2},$$

where q is a constellation size, to get a soft value for each bit.

With a subset ML detector, the challenge is that we do not know the Euclidean distances of competing bits in other candidate symbols, even though their hard decision values may have been correctly detected.

The search for competing distances relies on hard decision results. Let us again take a 2×2 MIMO system as an example. Assuming that is the hard decision result for layer-1, and $\{\hat{s}_{1,1}, \hat{s}_{1,2} \ldots \hat{s}_{1,q}\}$ are the closest symbols in the layer-1 constellation plane containing the competing bits to $\hat{s}_1$, illustratively the other candidate symbols in a search subset. With each $\hat{s}_{1,i}$, a subset in the layer-2 plane may be identified, such as described above. After finding the most likely symbol $\hat{s}_{2,i}$ within each subset, the resultant pair of symbols can be used for competing distance calculation. Therefore, the number of signal combinations searched is reduced from $$\frac{q^N}{2}$$

to the size of the subset, which is usually four. If considering a QAM-64 system, the difference would be 2048 vs 4.

To further simplify the search algorithm in the above example, hard decision values from the layer-2 plane may be used for all competing distance calculations to avoid the search for $\hat{s}_{2,i}$. In this case, however, since the contribution from layer-1 is disregarded, this step of simplification may result in a performance loss. From a complexity perspective, the search size is reduced to 1, as the closest symbol can be identified using a table of hard decision values stored in a memory, for example.

As has been explained earlier, Turbo decoders are vulnerable to errors of large soft value, even when errors are relatively few. Since a subset ML detector may miss the global ML solution when channel matrix condition is weak, errors caused by incorrect ML detection results may result in high soft values. This phenomenon may be characterized by low bit error rate (BER) but higher frame error rate (FER), for example, where both the BER and FER curves are flat.

Subset ML detection may allow detection of some of these errors. When the distance, illustratively a Euclidean distance, for a competing bit or symbol is smaller than that for the detected symbol, then the subset ML detection results are not globally optimum. When this is the case, the ML results may be updated and soft demapping may be repeated, or the detected symbol may simply be erased. The problems caused by wrongfully demapped soft bits tend to be much worse than those associated with setting them to zero.

One remaining issue is whether problematic soft bits should be erased on a per bit basis or a per symbol basis. In a single layer system, per bit erasure may be implemented, whereas in a MIMO system, an entire symbol may be erased. Per symbol erasure may be used for MIMO systems primarily because when the subset ML decision is incorrect, its competing symbols may also be incorrect, which may result in high competing distances after incorrectly detected symbols are combined with detected symbols from other layers. For this reason, symbol erasure may be used over using these symbols in any subsequent symbol processing, such as in a decoding process.

Figure 7:
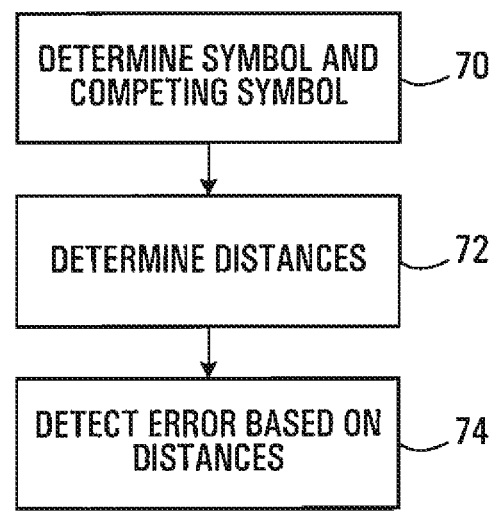
FIG. 7 is a flow diagram of a method according to one or more embodiments.

FIG. 7 is a flow diagram of a method according to one or more embodiments, and presents the above soft demapping concepts in a more general sense.

The method of FIG. 7 includes determining, at 70, a symbol detected in a communication signal and a competing symbol. It should be appreciated that the operation at 70 may or may not involve performing symbol detection. For example, in some embodiments, one component or software module or routine may detect symbols and a different component may perform the method of FIG. 7. Thus, the determination at 70 may include reading detected symbols and competing symbols from a memory. As described above, competing symbols may be selected from a search subset which includes the detected symbol.

At 72, distances between symbols, illustratively Euclidean distances, are determined. The distances determined at 72 include a first distance between the detected symbol and another symbol detected in the communication signals, and a second distance between the competing transmission symbol and a transmission symbol associated with the other detected symbol. In one embodiment, the associated symbol is actually the other detected symbol, such as in the above example of using a hard decision result for another layer instead of performing a subset search. According to another embodiment, an individual subset corresponding to the competing symbol is used to determine the symbol associated with the other detected symbol.

The distances determined at 72 are used at 74 to detect an error in the detected symbol. An error may be detected, for example, when the first distance exceeds the second distance. As will be apparent, the second distance represents a competing distance described above.

Although FIG. 7 explicitly refers to only one competing symbol, multiple competing symbols may be identified, with respective competing distances for each identified competing symbol being determined at 72 and used for error detection at 74. The competing symbols may include symbols from the search subset from which the detected symbol was selected, for example. In this case, most likely symbols from respective search subsets in other layers corresponding to each competing symbol may be identified and used in competing distance determination, as described above.

Responsive to an error detection at 74, an error processing operation may be performed. Error processing operations may include, for example, repeating a symbol detecting operation, including a hard decision operation and possibly a subsequent soft decision operation, and erasing a hard and/or soft detected symbol or a portion thereof.

A system implementing error detection and processing as described above may be substantially similar to the system of FIG. 5, with a transmitter being configured to encode information and transmit communication signals and a receiver being configured to determine a detected symbol for a transmission symbol in the communication signals and a competing transmission symbol for the detected symbol from the transmission symbol set, to determine a first distance between the detected symbol and another symbol detected in the communication signals and a second distance between the competing transmission symbol and a transmission symbol associated with the other detected symbol, and to detect an error in the detected symbol based on the first distance and the second distance.

Figure 8:
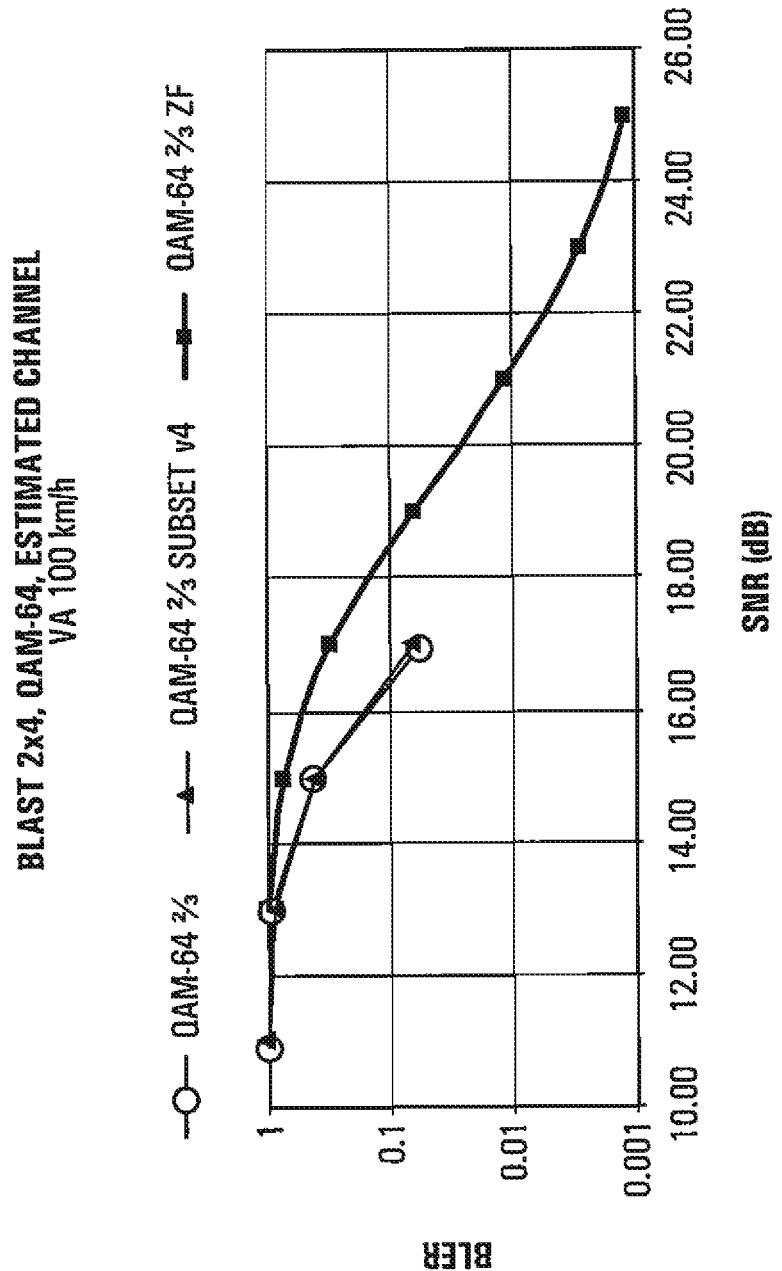
FIG. 8 is a plot of example simulation results.

FIG. 8 is a plot of example simulation results. As described above with reference to FIGS. 5 and 6, the simulation conditions and results shown in FIG. 8 are presented solely for illustrative purposes. Different simulation conditions or actual operating conditions may provide different results.

FIG. 8 shows that under the simulation conditions of a 2×4 MIMO system, 64-QAM symbol constellation, two-thirds code rate, vehicular A estimated channel, and receiver speed of 100 km/h, subset symbol detection with error detection and correction performs as well as full ML detection and better than ZF detection.

A subset ML detection scheme providing advantages of ML detection in a practical system, has been described above. One or more embodiments may include any of the following features:

iterative subset identification;
reduced search for competing distances; and
incorrect hard-decision error detection and processing.

The first above feature makes subset ML detection possible, particularly in higher order MIMO systems, while the second and third features make soft demapping practical in conjunction with subset ML symbol detection.

What has been described is merely illustrative of the application of principles of one or more embodiments. Other arrangements and methods can be implemented by those skilled in the art without departing from the scope of the present invention.

For example, ML detection and soft demapping as described above are not mutually exclusive. In one embodiment, soft demapping may be used to further process hard decision results produced by an ML detector, where other components of a communication signal receiver require soft decision results instead of hard decision results for instance. Soft demapping of a k th layer in a 4×4 MIMO system using hard decision results $\hat{s}_i$ may be performed by calculating a soft decision result $\tilde{s}_k$ as $$\tilde{s}_k = \frac{1}{H'(:,k)H(:,k)} H'(:,k)\vec{r}_k, \quad (6)$$

where $$\vec{r}_k = \vec{r} - \sum_{\substack{i=1 \\ i \neq k}}^{4} H(:,i)\hat{s}_i.$$

As described above, soft demapped bits may then be weighted using the factor $g_i$.

Thus, in a more general sense, a soft demapping method may include determining respective detected symbols for transmission symbols in a plurality of the communication signals, as described above for instance. Based on other detected symbols, a soft decision result for each detected symbol may be determined, illustratively as $$\vec{r}_k = \vec{r} - \sum_{i \neq k} H(:,i)\hat{s}_i.$$

A respective weight for each soft decision result may then be determined and applied to the soft decision results. Such a method may be embodied in a system having an input and a processor configured to determine respective detected symbols for transmission symbols in a plurality of the communication signals, to determine a soft decision result for each detected symbol based on others of the detected symbols, to determine a respective weight for each soft decision result, and to apply the corresponding weights to the soft decision results.

It should also be appreciated that any of the features disclosed herein may be applied to other dimensions of MIMO systems than those explicitly described herein.

Methods and systems have been described above and shown in the drawings only to the extent necessary to convey an understanding of illustrative embodiments of the invention. Complete communication signal processing methods, transmitters, and receivers may include further and different steps or components than those specifically shown and described. For example, a receiver may include a memory for storing an adjusted channel matrix for iterations of the above search subset identification, and hard decision results for subsequent competing distance calculation or soft demapping. Transmitters and receivers also often support time/frequency domain transformation functions such as Fast Fourier Transforms (FFTs) and Inverse FFTs (IFFTs) for processing information before or after encoding and decoding operations.

In addition, although described primarily in the context of methods and systems, other implementations of the invention are also contemplated, as instructions stored on a computer-readable medium for example.

The invention claimed is:

1. A method comprising:
   receiving, at a computing device, multiple symbols of a transmission symbol set at substantially the same time;
   identifying a first symbol of the multiple symbols of the transmission symbol set based on the first symbol satisfying a selection criterion, the selection criterion based on a signal to interference and noise ratio (SINR) of the first symbol;
   identifying a search subset of the transmission symbol set for the first symbol; and
   identifying multiple search subsets of the transmission symbol set for a second symbol of the multiple symbols of the transmission symbol set, the multiple search subsets comprising respective search subsets based on each transmission symbol in the search subset for the first symbol.

2. The method of claim 1, further comprising:
   receiving a third symbol at substantially the same time as the first symbol and the second symbol; and
   identifying multiple additional search subsets of the transmission symbol set for the third symbol, the multiple additional search subsets comprising respective search subsets based either on each transmission symbol in the search subset for the first symbol or on each transmission symbol in the search subset for the second symbol.

3. The method of claim 2, further comprising:
   adjusting a communication signal model for the first symbol; and
   determining a characteristic of the second and third symbols based on the adjusted communication signal model, wherein identifying multiple search subsets comprises identifying multiple search subsets, for one of the second and third symbols for which the determined characteristic satisfies a selection criterion, based on each transmission symbol in the search subset for the first symbol.

4. The method of claim 2, wherein identifying multiple search subsets comprises iterating an operation of identifying multiple search subsets for each of the other symbols, the multiple search subsets identified for a symbol in an iteration comprising respective search subsets based on each transmission symbol in each of the multiple search subsets identified for a different symbol in a preceding iteration.

5. The method of claim 1, further comprising:
   receiving a plurality of further symbols at substantially the same time as the first symbol and the second symbol; and
   identifying multiple additional search subsets of the transmission symbol set for each further symbol, the multiple additional search subsets comprising respective search subsets based on each transmission symbol in the search subset for another of either the first symbol, the second symbol, or another of the further symbols.

6. The method of claim 1, wherein identifying the search subset and identifying the multiple search subsets comprise estimating transmission symbols in the transmission symbol set using a zero forcing (ZF) algorithm.

7. The method of claim 1, wherein the selection criterion comprises at least one of an absolute SINR criterion or a relative SINR criterion.

8. The method of claim 1, wherein the selection criterion comprises the symbol with a highest SINR.

9. A system for processing communication signals at a receiver, the communications signals comprising transmission symbols associated with a transmission symbol set, the system comprising:
   an input configured to receive multiple symbols of the transmission symbol set at substantially the same time; and
   at least a memory and a processor configured to:
      identify a first symbol of the multiple symbols of the transmission symbol set based on the first symbol satisfying a selection criterion, the selection criterion based on a signal to interference and noise ratio (SINR) of the first symbol;
      identify a search subset of the transmission symbol set for the first symbol; and
      identify multiple search subsets of the transmission symbol set for a second symbol of the multiple symbols of the transmission symbol set, the multiple search subsets comprising respective search subsets based on each transmission symbol in the search subset for the first symbol.

10. The system of claim 9, wherein the processor is configured to identify the search subset and to identify the multiple search subsets by estimating the transmission symbols in the communication signals using a zero forcing (ZF) algorithm.

11. The system of claim 9, wherein the selection criterion comprises at least one of an absolute SINR criterion or a relative SINR criterion.

12. The system of claim 9, wherein the processor is configured to identify multiple additional search subsets of the transmission symbol set for a third symbol of the multiple symbols of the transmission symbol set, the multiple additional search subsets comprising respective search subsets based either on each transmission symbol in the search subset for the first symbol or on each transmission symbol in the search subset for the second symbol.

13. The system of claim 12, wherein the processor is configured to:
    adjust a communication signal model for the first symbol; and
    determine a characteristic of the second and third symbols based on the adjusted communication signal model, wherein identifying multiple search subsets comprises identifying multiple search subsets, for one of the second and third symbols for which the determined characteristic satisfies a selection criterion, based on each transmission symbol in the search subset for the first symbol.

14. The system of claim 12, wherein identifying multiple search subsets comprises iterating an operation of identifying multiple search subsets for each of the other symbols, the multiple search subsets identified for a symbol in an iteration comprising respective search subsets based on each transmission symbol in each of the multiple search subsets identified for a different symbol in a preceding iteration.

15. The system of claim 9, wherein the processor is configured to:
receive a plurality of further symbols at substantially the same time as the first symbol and the second symbol; and
identify multiple additional search subsets of the transmission symbol set for each further symbol, the multiple additional search subsets comprising respective search subsets based on each transmission symbol in the search subset for another of either the first symbol, the second symbol, or another of the further symbols.

16. The system of claim 9, wherein the selection criterion comprises the symbol with a highest SINR.

17. One or more computer-readable storage devices having instructions stored thereon that, responsive to execution by a processor, perform operations comprising:
identifying a first symbol of multiple symbols of a transmission symbol set based on the first symbol satisfying a selection criterion, the selection criterion based on a signal to interference and noise ratio (SINR) of the first symbol;
identifying a search subset of the transmission symbol set for the first symbol; and
identifying multiple search subsets of the transmission symbol set for a second symbol of the multiple symbols of the transmission symbol set, the multiple search subsets comprising respective search subsets based on each transmission symbol in the search subset for the first symbol.

18. The one or more computer-readable storage devices of claim 17, wherein the instructions, responsive to execution by the processor, perform operations further comprising identifying the search subset and to identify the multiple search subsets by estimating the transmission symbols in the communication signals using a zero forcing (ZF) algorithm.

19. The one or more computer-readable storage devices of claim 17, wherein the selection criterion comprises at least one of an absolute SINR criterion or a relative SINR criterion.

20. The one or more computer-readable storage devices of claim 17, wherein the selection criterion comprises the symbol with a highest SINR.

* * * * *